United States Patent
Komori et al.

(10) Patent No.: US 7,056,218 B2
(45) Date of Patent: Jun. 6, 2006

(54) ELASTIC SHAFT COUPLING AND METHOD OF MANUFACTURING COUPLING ELEMENT

(75) Inventors: Hiromichi Komori, Gunma-ken (JP); Kiyoshi Sadakata, Gunma-ken (JP)

(73) Assignee: NSK Ltd., Tokyo (JP)

( * ) Notice: Subject to any disclaimer, the term of this patent is extended or adjusted under 35 U.S.C. 154(b) by 130 days.

(21) Appl. No.: 09/904,908

(22) Filed: Jul. 16, 2001

(65) Prior Publication Data
US 2002/0010029 A1 Jan. 24, 2002

(30) Foreign Application Priority Data
Jul. 18, 2000 (JP) ............................ 2000-217649

(51) Int. Cl.
*F16D 3/52* (2006.01)

(52) U.S. Cl. ....................... 464/89; 464/74; 464/182
(58) Field of Classification Search ................ 464/74, 464/89, 182, 183, 134; 72/370.11, 370.1
See application file for complete search history.

(56) References Cited

U.S. PATENT DOCUMENTS

| | | | |
|---|---|---|---|
| 3,247,698 A * | 4/1966 | Baldwin et al. | 72/370.11 |
| 3,501,928 A | 3/1970 | Pitner | |
| 4,062,701 A * | 12/1977 | Juhas | 72/370.11 |
| 4,983,143 A * | 1/1991 | Sekine et al. | 464/89 |
| 5,245,890 A * | 9/1993 | Honlinger et al. | 74/574 |
| 5,672,111 A * | 9/1997 | Schremmer et al. | 464/75 |
| 5,836,821 A * | 11/1998 | Yamada et al. | 464/89 |
| 5,916,026 A * | 6/1999 | Sadakata | 464/89 |
| 6,283,867 B1 * | 9/2001 | Aota et al. | 464/74 |
| 6,408,672 B1 * | 6/2002 | Roe et al. | 72/370.11 |

FOREIGN PATENT DOCUMENTS

| | | | |
|---|---|---|---|
| FR | 2637334 A * | 4/1990 |
| GB | 2 057 632 | 4/1981 |
| GB | 2057632 A * | 4/1981 |
| GB | 2322687 A * | 2/1998 |
| JP | 56-39325 | 4/1981 |
| JP | 57-45925 | 9/1982 |
| JP | 61-201926 | 9/1986 |
| JP | UM 6-1855 | 1/1994 |
| JP | UM 6-53825 | 7/1994 |
| JP | 6-329033 | 11/1994 |
| JP | 8-170647 | 7/1996 |
| JP | 10-89373 | 4/1998 |

* cited by examiner

*Primary Examiner*—Aaron Dunwoody
(74) *Attorney, Agent, or Firm*—Miles & Stockbridge P.C.

(57) ABSTRACT

An elastic shaft coupling and a manufacturing method of an element of the coupling, which realize reduction of the manufacturing cost while maintaining a sufficient strength of the coupling. The elastic shaft coupling has a coupling element which is formed by interposing between a joint member and a hollow shaft member an elastic member for flexing and deforming upon a relative rotation therebetween and forming stopper portions for restricting the relative rotation within a predetermined amount respectively on the joint member and the hollow shaft member. The stopper portion on the hollow shaft member side is formed by plastically processing the end portion of the material of the hollow shaft member into a flange shape.

18 Claims, 7 Drawing Sheets

ELASTIC SHAFT COUPLING AND METHOD OF MANUFACTURING COUPLING ELEMENT

This application claims the benefit of Japanese Patent Application No. 2000-217649 which is hereby incorporated by reference.

BACKGROUND OF THE INVENTION

1. Field of the Invention

The present invention relates to an elastic shaft coupling which is used in a steering apparatus, or the like, of a car, and a method of manufacturing an element of the coupling and, more particularly, to a technology for reducing the weight or the manufacturing cost of the coupling while maintaining a sufficient strength of a stopper portion.

2. Related Background Art

A steering apparatus of a car, or the like, is comprised of a steering wheel to be used for steering operation of the driver, a steering gear for steering the wheels of the car, and a steering shaft used for coupling the steering wheel and the steering gear. Then, in the steering apparatus of a car, the steering gear is seldom positioned on the center axial line of the steering wheel, so that a plurality of steering shafts which are coupled to each other by universal joints are often used. As the universal joint for the steering shafts, a Cardan joint having a cross piece (cross shaft) which is inserted between a pair of coupling elements to be rockable is generally used, as disclosed in the U.S. Pat. No. 3,501,928.

Recently, in order to reduce transmission of kickback, or the like, from a road surface to the steering wheel, an elastic shaft coupling which employs an elastic member such as synthetic rubber is proposed, as in the Japanese Patent Application Laid-Open No. 10-89373. In an elastic shaft coupling of this type, one of the coupling elements of the Cardan joint is divided into a joint member (i.e., a yoke) and a shaft, and an elastic ring formed of synthetic rubber, or the like, is inserted between the yoke and the shaft. In order to prevent damage, or to improve the durability of the elastic ring, a stopper portion for restricting a relative rotation within a predetermined amount is formed between the yoke and the shaft.

Incidentally, in the elastic shaft coupling described above, if a so-called stopper strike is repeatedly brought about due to a load of a large torque, it is required to prevent deformation or damage of the joint member or the stopper portion of the shaft, which does not become a significant problem since the yoke is normally formed by pressing or forging from a steel plate, or the like, having a comparatively large thickness. However, the size of the shaft is inevitably reduced since the shaft is normally set inside a yoke member. As a result, it becomes difficult to maintain the strength of the stopper portion.

For this reason, though the shaft may be formed by a multiple stage forming machine from a carbon steel bar having a comparatively high hardness, there arises a problem in this case that the manufacturing cost of the shaft is increased due to a large size of the forming machine or an increased number of forming molds. For instance, in order to form an elongated shaft by a forming machine, a comparatively large metal mold is required. However, in this case, the metal mold can not be installed unless the forming machine is of a large size. For this reason, when the length of the shaft is 100 mm or more, there may be a case in which the existing forming machine can not be used for the processing so that a large-sized forming machine has to be introduced inevitably.

If the stopper portion and the shaft have the same diameter size, the forming machine requires a metal mold corresponding to the total length of the shaft, so that a large number of metal molds are required to be manufactured when a large kinds of products are to be produced on a small-lot basis. As a result, the unit cost of a small-lot products inevitably exceeds an allowed range if the production cost of such molds is included. Further, when a collapsible mechanism against a secondary collision by a driver is provided in a coupling element, as disclosed in the Japanese Patent Application Laid-Open No. 8-91230, the shaft is formed in the shape of a pipe so that the steering shaft can advance into the shaft. However, the processing therefor requires a large number of steps, thereby increasing the manufacturing cost of the shaft.

On the other hand, it is possible to employ a cold forging and pressing treatment which has less restrictions with respect to the size or the material of the shaft. However, in this case, an annealing step is required for softening a work which has been treated and hardened for each main forming step, so that the productivity drastically declines to inevitably increase the manufacturing cost, also.

SUMMARY OF THE INVENTION

The present invention was contrived taking the above circumstances into consideration, and an object of the invention is to provide an elastic shaft coupling and a manufacturing method of an element of the coupling, which realize reduction of the manufacturing cost while maintaining a sufficient strength of the coupling, In order to solve the above problems, according to a first aspect of the present invention, there is proposed an elastic shaft coupling having a coupling element which is formed by interposing between a joint member and a hollow shaft member an elastic member for flexing and deforming upon a relative rotation therebetween and forming stopper portions for restricting the relative rotation within a predetermined amount respectively on the joint member and the hollow shaft member, characterized in that:

the stopper portion on the hollow shaft member side is formed by plastically processing the end portion of the material of the hollow shaft member into a flange shape.

According to the first aspect of the present invention, the stopper portion is formed by, for instance, bending and raising up the end portion a low carbon steel pipe, while enlarging the diameter thereof.

Also, according to a second aspect of the present invention, in the elastic shaft coupling of the first aspect, the stopper portion on the hollow shaft member side may be provided with a rib for reinforcement, so as to enhance the strength and the rigidity of the base end of the stopper portion by the reinforcing rib.

Also, according to a third aspect of the present invention, in the elastic shaft coupling of the first or second aspect, the outer diameter of the stopper portion on the hollow shaft member side may be made smaller than the outer diameter of the stopper portion on the joint member side, so that since an amount of the plastic processing for forming the stopper portion on the hollow shaft member side is small, a defect such as a crack is difficult to occur and, at the same time, a stress on the base end of the stopper portion at a stopper strike can be reduced.

According to a fourth aspect of the present invention, the elastic shaft coupling of the first or second aspect is arranged such that the stopper portion on the joint member is brought into contact with the stopper portion on the hollow shaft member from the center thereof in response to the relative rotation mentioned above so that the stress on the base end of the stopper portion at a stopper strike is reduced.

Also according to the fourth aspect of the present invention, in a method of manufacturing an elastic shaft coupling comprising a coupling element which is formed by interposing between a joint member and a hollow shaft member an elastic member for flexing and deforming upon a relative rotation therebetween and forming stopper portions for restricting the relative rotation within a predetermined amount respectively on the joint member and the hollow shaft member, the stopper portion on the hollow shaft member side is formed into the shape of a flange while a pressing force in the axial direction is applied onto the hollow shaft member, so that the thickness of the base end of the stopper portion can be increased by, for instance, gradually bending and raising up the stopper portion while applying the pressing force in the axial direction thereon.

DETAILED DESCRIPTION OF THE PREFERRED EMBODIMENTS

An elastic shaft coupling according to the present invention will be described by way of several embodiments.

Figure 1:
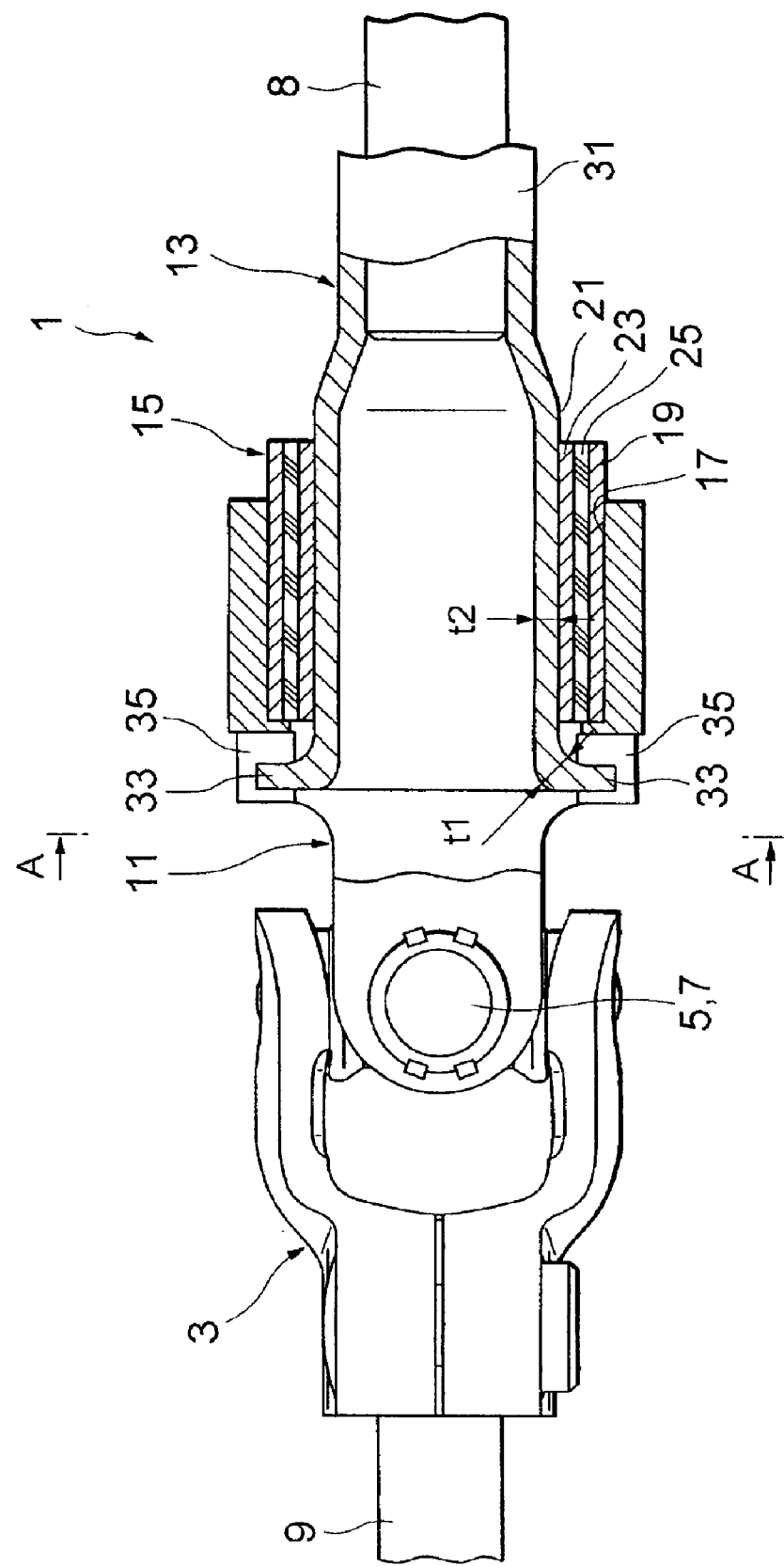
FIG. 1 is a side view of a Cardan joint according to a first embodiment of the present invention.
Figure 2:
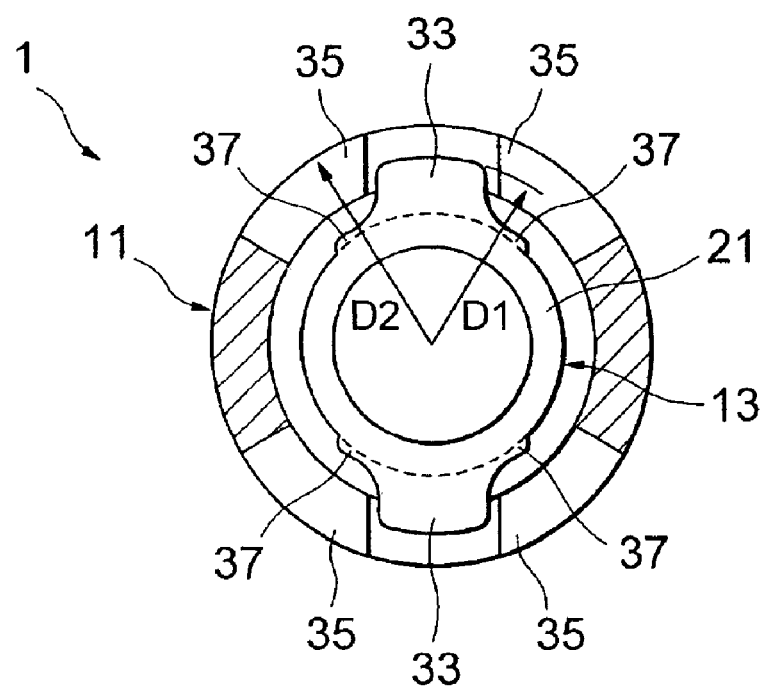
FIG. 2 is a cross sectional view, taken along line A—A in FIG. 1.

FIG. 1 is a side view, partially in cross section, of a Cardan joint in which an elastic shaft coupling (yoke assembly) according to a first embodiment is assembled, while FIG. 2 is a cross sectional view taken along line A—A in FIG. 1, As shown in FIG. 1, the Cardan joint is composed of a yoke assembly 1 according to the present invention, a partner yoke 3, a cross joint 5, and a bearing (needle roller bearing) 7, so as to couple the first steering shaft 8 and the second steering shaft 9 to each other to be freely rockable.

The yoke assembly 1 comprises a yoke 11 which is formed by deep drawing and pressing using a hot rolled steel plate, or the like, as its material, a shaft 13 formed of a low carbon steel pipe by pressing, and an elastic ring 15 which is interposed between the yoke 11 and the shaft 13. The elastic ring 15 comprises an outer sleeve 19 which is press-fitted in a core hole 17 of the yoke 11, an inner sleeve 23 in which a front tube portion 21 of the shaft 13 is press-fitted, and a synthetic rubber 25 which is filled and vulcanizing-bonded between the outer sleeve 19 and the inner sleeve 23. The synthetic rubber 25 is flexed and deformed upon a relative rotation between the yoke 11 and the shaft 13.

The shaft 13 is composed of a front tube portion 21 having a comparatively large diameter, a rear tube portion 31 having a comparatively small diameter, and a pair of stopper portions 33 formed at the tip end of the front tube portion 21. The stopper portions 33 are bent and raised each into the form of a flange at an interval of 180° from the front tube portion 21, so as to face stopper portions 35 of the partner yoke, 3 with a predetermined gap therebetween. In this case, a pair of stopper portions may be bent and raised once each to have the entire circumference in the form of a flange and then trimmed into the form of a stopper. Each of the stopper portions 33 is formed to have at the end portion thereof reinforcement ribs 37 which are provided on the base portion along the circumferential direction, and has an outer diameter D1 which is significantly smaller than the outer diameter D2 of the stopper portion 35 of the partner yoke 3.

Figure 3:
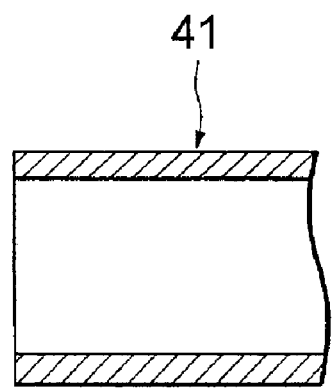
FIG. 3 is a longitudinal cross sectional view for showing a material of a shaft.
Figure 4:
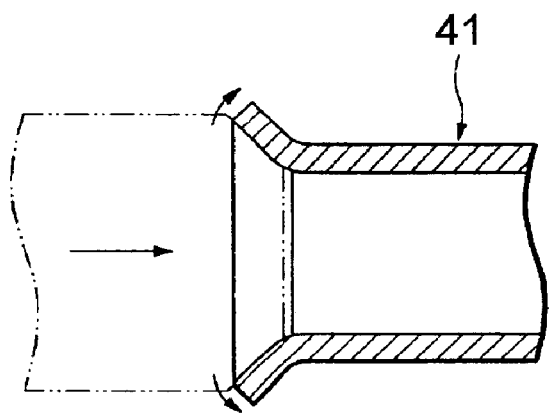
FIG. 4 is a longitudinal cross sectional view for showing a preliminary forming step of a stopper portion.
Figure 5:
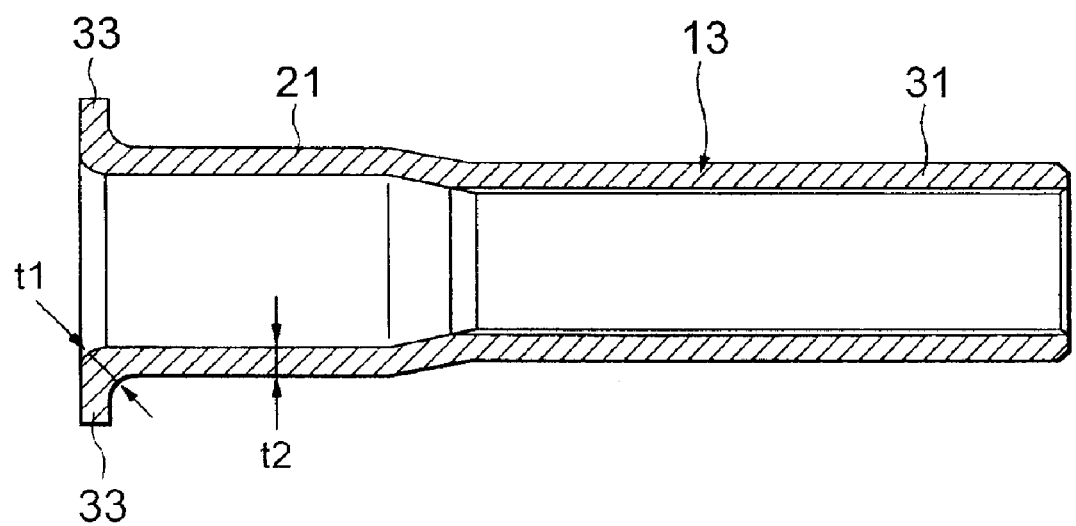
FIG. 5 is a longitudinal cross sectional view for showing a completed state of the stopper portion.
Figure 6:
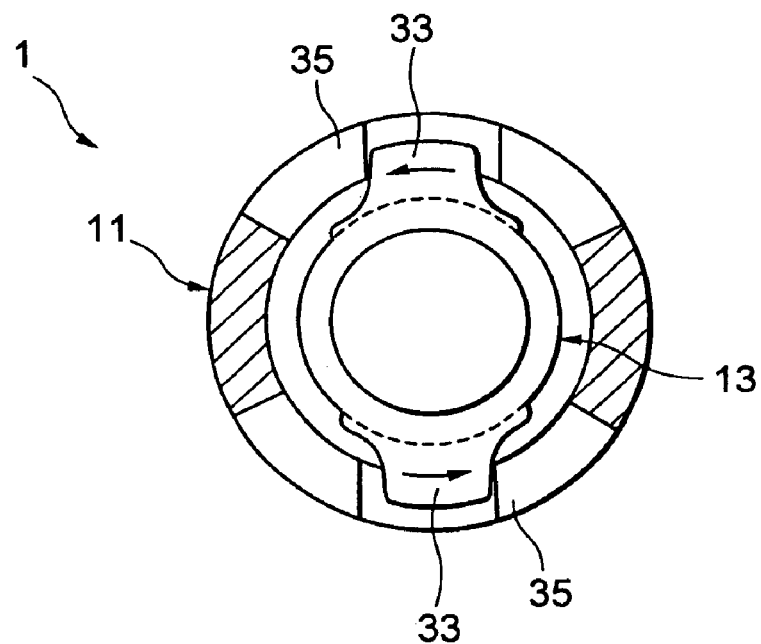
FIG. 6 is an explanatory view for showing an operation at a stopper strike according to the first embodiment.

The stopper portion 33 is formed such that the thickness t1 of the portion (root portion) continuing to the front tube portion 21 is substantially larger than the thickness t2 of the front tube portion 21. In case of the present embodiment, in order to increase the thickness of the root portion, the following steps are conducted. That is, a preliminary forming is conducted to the material (low carbon steel pipe) 41 shown in FIG. 3 while applying a pressing force in the axial direction, as shown in FIG. 4. After that, as shown in FIG. 5, the stopper portion 33 is bent and raised up, whereby the material is crushed at the root of the stopper portion 33. As a result, the thickness t1 of this portion is substantially larger than the thickness which is obtained simply by bending and raising of the material.

Description will be made below of a mode of operation of the first embodiment.

When the driver conducts a steering operation while driving or receives a kickback from the road surface, a relative rotation is generated between the yoke assembly 1 and the partner yoke 3 due to a rotational reacting force in the Cardan joint. Then, when this relative rotation is small, the synthetic rubber 25 of the elastic ring 15 is flexed and deformed, so as to prevent unpleasant shimmy or shock from being transmitted to the hand of the driver. However, when an amount of the relative rotation exceeds a predetermined value in a sudden steering operation, or the like, the stopper portions 33 on the shaft 13 and the stopper portions 35 on the yoke 11 cause a so-called stopper strike, thereby preventing damage to the elastic ring 15 (synthetic rubber 25) due to an excessive flexion or deformation, or reduction of the durability thereof.

In this case, a shearing stress is applied on the stopper portions 33 on the shaft 13 side. However, for the stopper portions 33 of the present embodiment, the reinforcement ribs 37 are formed at the base portion thereof, the outer diameter D1 is formed small, and the thickness t1 of the root portion is formed large. As a result, the strength of the base portion at which the stress is liable to concentrate is formed significantly higher than that of a conventional one, whereby damage or deformation hardly occur. Moreover, since being formed of a comparatively light steel pipe, the shaft 13 can be made remarkably lighter at a far lower cost than a shaft produced by the conventional forming machine. In addition, it is no longer required to form a hole through which the steering shaft 8 is to be passed.

Figure 7:
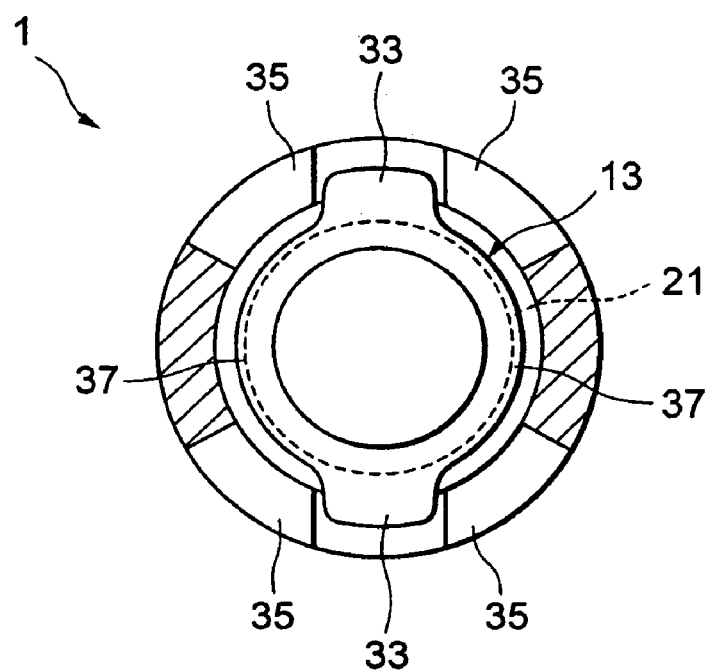
FIG. 7 is a cross sectional view for showing a yoke assembly according to a second embodiment of the present invention.
Figure 8:
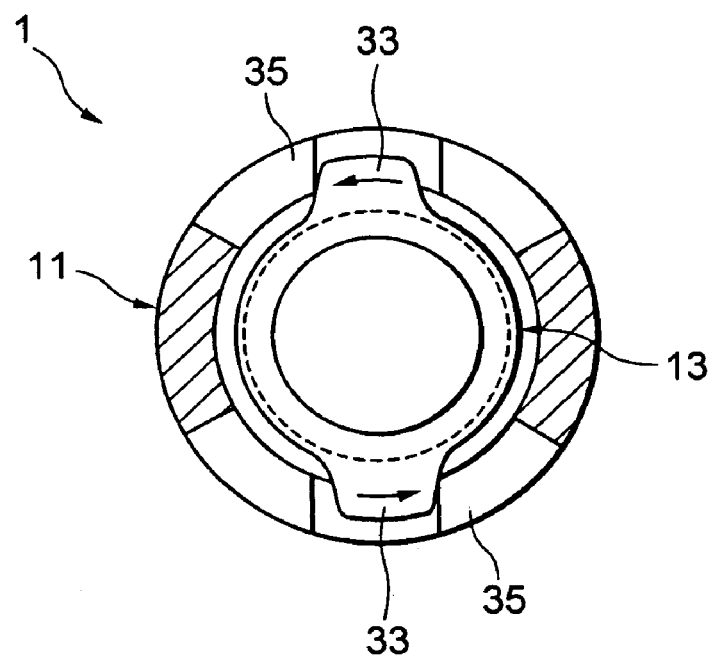
FIG. 8 is a cross sectional view for showing the yoke assembly according to the second embodiment of the present invention.

FIG. 7 and FIG. 8 are cross sectional views for showing a yoke assembly 1 according to a second embodiment of the present invention, in which FIG. 7 shows the yoke assembly 1 in the normal state, while FIG. 8 shows the state at a stopper strike. The entire structure of the second embodiment and the mode of operation thereof are substantially the same as those of the first embodiment described above, except that the reinforcement ribs 37 are disposed along the entire circumference of the yoke assembly and the strength of the stopper portion 33 is further enhanced.

Figure 9:
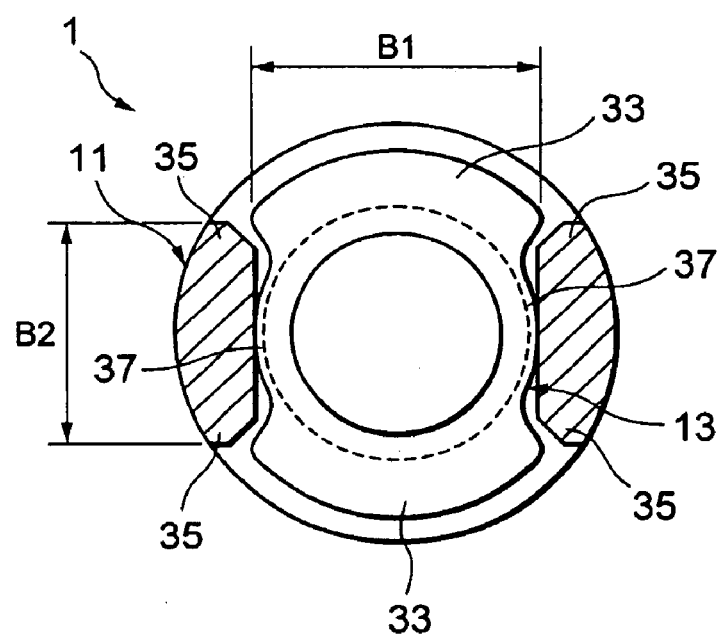
FIG. 9 is a cross sectional view for showing a yoke assembly according to a third embodiment of the present invention.
Figure 10:
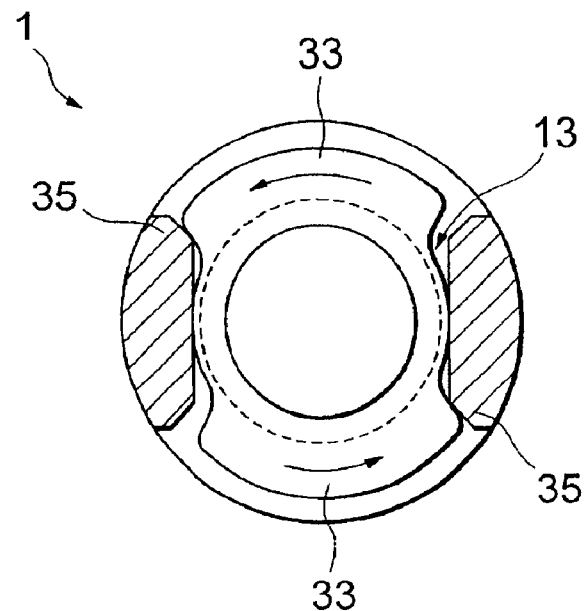
FIG. 10 is a cross sectional view for showing the yoke assembly according to the third embodiment of the present invention.

FIG. 9, and FIG. 10 are cross sectional views for showing a yoke assembly 1 according to a third embodiment of the present invention, in which FIG. 9 shows the yoke assembly 1 in the normal state, while FIG. 10 shows the state at a stopper strike. The entire structure of the third embodiment and the mode of operation thereof are substantially the same as those of the second embodiment described above, except that the breadth B1 of the stopper portion 33 on the shaft 13 side is larger than the breadth B2 of the stopper portion 35 on the yoke 11 side, so that the strength of the stopper portion 33 is further enhanced.

Figure 11:
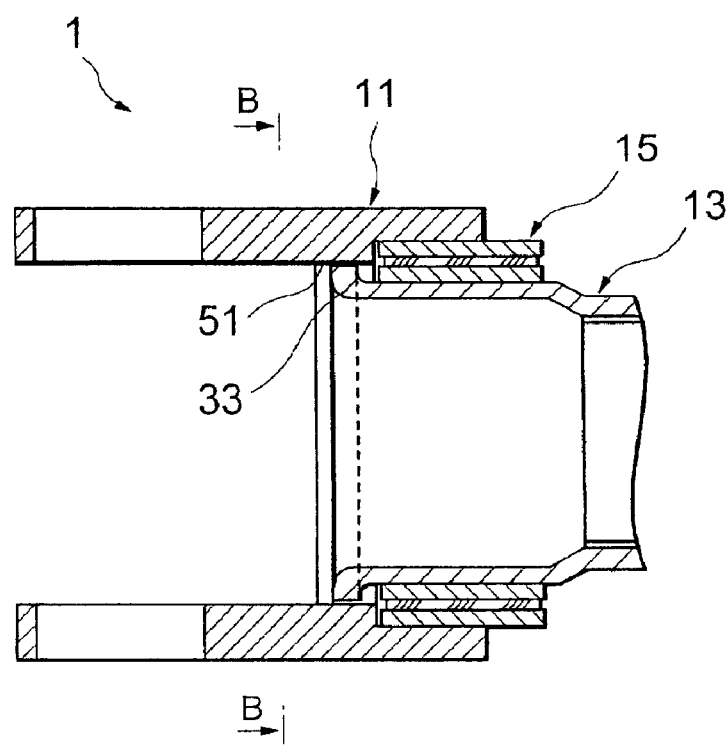
FIG. 11 is a side view (cross sectional view) for showing a yoke assembly according to a fourth embodiment of the present invention.
Figure 12:
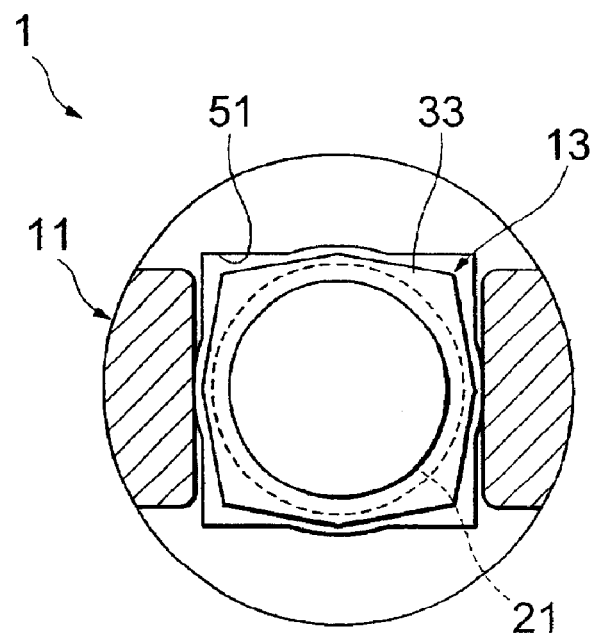
FIG. 12 is a cross sectional view, taken along line B—B in FIG. 11, in the normal condition.
Figure 13:
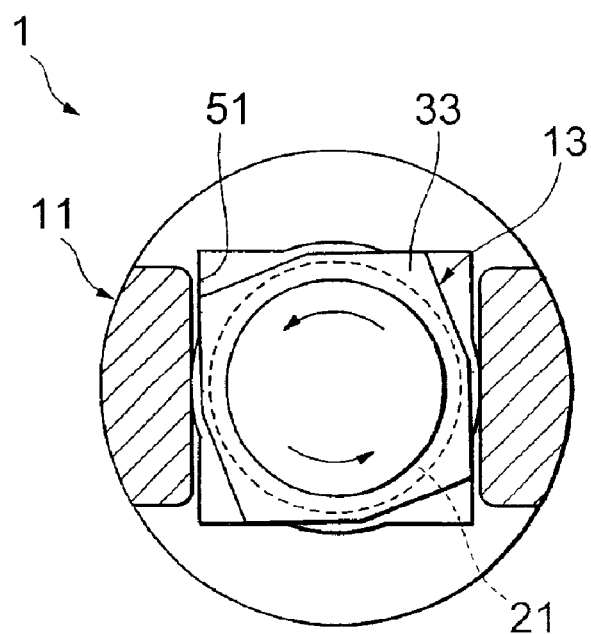
FIG. 13 is a cross sectional view, taken along line B—B in FIG. 11, at the stopper strike.

FIG. 11 is a longitudinal cross sectional view for showing a yoke assembly 1 according to a fourth embodiment of the present invention, and FIG. 12 and FIG. 13 are cross sectional views taken along the line B—B in FIG. 11 corresponding to the normal state and the state at a stopper strike. The entire structure of the fourth embodiment and the mode of operation thereof are substantially the same as those of the foregoing embodiments, except that a stopper hole 51 having a substantially square shape is formed on the yoke 11 while a stopper portion 33 having a deformed octagonal shape is formed on the shaft 13 to be corresponding to this stopper hole 51.

As described above, in each of the foregoing embodiments, it is possible to form the stopper portions 33 having the high strength while employing a comparatively light and inexpensive low carbon steel pipe as a material for the shaft 13, whereby the durability of the yoke assembly 1 can be enhanced and the weight and the cost thereof can be reduced.

Though the specific description of the embodiments are completed as above, the present invention is not limited to these embodiments. For instance, in the foregoing embodiments, the present invention is applied to a Cardan joint. However, the present invention may be applied to a double Cardan joint, a bar field joint, or the like. In addition, the form of the stopper portion or the structure of the elastic ring may properly varied and modified within the scope and spirit of the present invention.

As described above, the elastic shaft coupling according to the present invention has a coupling element which is formed by interposing between a joint member and a hollow shaft member an elastic member for flexing and deforming upon a relative rotation between these two members and forming stopper portions for restricting the relative rotation within a predetermined amount respectively on the joint member and the hollow shaft member. In this case, the stopper portions on the hollow shaft member side are formed by plastically processing the end portion of the material of the hollow shaft member into a flange shape, so that it is possible to reduce the weight and the manufacturing cost of the coupling while maintaining the sufficient durability thereof.

What is claimed is:

1. An elastic shaft coupling comprising:
a joint member formed with a hole;
a hollow shaft member formed of a steel pipe received in the joint member;
an elastic member interposed radially between the joint member and the hollow shaft member to flex and deform upon relative rotation between the joint member and the hollow shaft member;
stopper portions provided, respectively, on the joint member and the hollow shaft member to restrict the relative rotation therebetween within a predetermined amount; and
the stopper portions provided on said joint member each including a pair of stopper faces spaced from each other in a peripheral direction to form a gap therebetween,
the stopper portions provided on said hollow shaft member each being radially outwardly projected into said gap formed between said stopper faces of the corresponding stopper portion provided on said joint member,
said stopper portions on said hollow shaft member being formed by plastically processing an end of the hollow shaft member to be projected radially outwardly, and
the stopper portions on said hollow shaft member being provided with ribs for reinforcement.

2. An elastic shaft coupling according to claim 1, wherein the outer diameter of the stopper portion on said hollow shaft member side is formed smaller than the outer diameter of the stopper portion on said joint member side.

3. An elastic shaft coupling according to claim 1, wherein said pipe is of a low carbon steel.

4. An elastic shaft coupling comprising:
a joint member formed with a hole;
a hollow shaft member received in the joint member;
an elastic member interposed radially between the joint member and the hollow shaft member to flex and deform upon relative rotation between the joint member and the hollow shaft member;
stopper portions provided, respectively, on the joint member and the hollow shaft member to restrict the relative rotation therebetween within a predetermined amount; and
the stopper portions provided on said joint member each including a pair of stopper faces spaced from each other in a peripheral direction to form a gap therebetween,
the stopper portion, provided on said hollow shaft member each being radially outwardly projected into said gap formed between said stopper faces of the corresponding stopper portion provided on said joint member,
said stopper portions on said hollow shaft member being formed by flaring an end of the hollow shaft member to be projected radially outwardly,
wherein the stopper portions on said hollow shaft member are provided with ribs for reinforcement.

5. An elastic shaft coupling comprising:
a joint member formed with a hole;
a hollow shaft member received in the joint member;

an elastic member interposed radially between the joint member and the hollow shaft member to flex and deform upon relative rotation between the joint member and the hollow shaft member;

stopper portions provided, respectively, on the joint member and the hollow shaft member to restrict the relative rotation therebetween within a predetermined amount; and the stopper portions provided on said joint member each including a pair of stopper faces spaced from each other in a peripheral direction to form a gap therebetween, the stopper portions provided on said hollow shaft member each being radially outwardly projected into said gap formed between said stopper faces of the corresponding stopper portion provided on said joint member, said stopper portions on said hollow shaft member being formed by flaring an end of the hollow shaft member to be projected radially outwardly, wherein radially, outermost points of contact of the stopper portions on said hollow shaft member with the stopper faces on said joint member are disposed inwardly from respective centers of said stopper faces in a radial direction.

6. An elastic shaft coupling comprising:

a joint member formed with a hole;

a hollow shaft member formed of a pipe received in the joint member, said pipe having an original wall thickness ($t_2$);

an elastic member interposed radially between the joint member and the hollow shaft member to flex and deform upon relative rotation between the joint member and the hollow shaft member;

stopper portions provided, respectively, on the joint member and the hollow shaft member to restrict the relative rotation therebetween within a predetermined amount; and the stopper portions provided on said joint member each including a pair of stopper faces spaced from each other in a peripheral direction to form a gap therebetween, the stopper portions provided on said hollow shaft member each being radially outwardly projected into said gap formed between said stopper faces of the corresponding stopper portion provided on said joint member, said stopper portions on said hollow shaft member being formed by flaring an end of the hollow shaft member while applying axial pressure on said end to produce a root portion of the stopper portion on the hollow shaft member having a thickness ($t_1$) greater than the original wall thickness ($t_2$) of said hollow shaft member, wherein the stopper portions on said hollow shaft member are provided with ribs for reinforcement.

7. An elastic shaft coupling comprising:

a joint member formed with a hole;

a hollow shaft member formed of a pipe received in the joint member, said pipe having an original wall thickness ($t_2$);

an elastic member interposed radially between the joint member and the hollow shaft member to flex and deform upon relative rotation between the joint member and the hollow shaft member;

stopper portions provided, respectively, on the joint member and the hollow shaft member to restrict the relative rotation therebetween within a predetermined amount; and the stopper portions provided on said joint member each including a pair of stopper faces spaced from each other in a peripheral direction to form a gap therebetween, the stopper portions provided on said hollow shaft member each being radially outwardly projected into said gap formed between said stopper faces of the corresponding stopper portion provided on said joint member, said stopper portions on said hollow shaft member being formed by flaring an end of the hollow shaft member while applying axial pressure on said end to produce a root portion of the stopper portion on the hollow shaft member having a thickness ($t_1$) greater than the original wall thickness ($t_2$) of said hollow shaft member, wherein only portions of radially inward halves of the faces of the stopper portions on said joint member are brought into contact with the faces of the stopper portions on said hollow shaft member in accordance with said relative rotation.

8. An elastic shaft coupling according to claim 7, wherein said pipe is of low carbon steel.

9. An elastic shaft coupling according to claim 1, wherein each said stopper portion on said hollow shaft member has a root portion unitary with said hollow shaft member and having a radially inner surface that is curved in an axial cross-section of said hollow shaft member.

10. An elastic shaft coupling according to claim 9, wherein said root portion has a radially outer surface that is curved in said axial cross-section of said hollow shaft member.

11. An elastic shaft coupling according to claim 4, wherein each said stopper portion on said hollow shaft member has a root portion unitary with said hollow shaft member and having a radially inner surface that is curved in an axial cross-section of said hollow shaft member.

12. An elastic shaft coupling according to claim 11, wherein said root portion has a radially outer surface that is curved in said axial cross-section of said hollow shaft member.

13. An elastic shaft coupling according to claim 5, wherein each said stopper portion on said hollow shaft member has a root portion unitary with said hollow shaft member and having a radially inner surface that is curved in an axial cross-section of said hollow shaft member.

14. An elastic shaft coupling according to claim 10, wherein said root portion has a radially outer surface that is curved in said axial cross-section of said hollow shaft member.

15. An elastic shaft coupling according to claim 6, wherein said root portion is unitary with said hollow shaft member and has a radially inner surface that is curved in an axial cross-section of said hollow shaft member.

16. An elastic shaft coupling according to claim 15, wherein said root portion has a radially outer surface that is curved in said axial cross-section of said hollow shaft member.

17. An elastic shaft coupling according to claim 7, wherein said root portion is unitary with said hollow shaft member and has a radially inner surface that is curved in an axial cross-section of said hollow shaft member.

18. An elastic shaft coupling according to claim 17, wherein said root portion has a radially outer surface that is curved in said axial cross-section of said hollow shaft member.

* * * * *